(12) United States Patent
Ling et al.

(10) Patent No.: US 12,011,748 B2
(45) Date of Patent: Jun. 18, 2024

(54) GENERATING DEVICE BASED ON FRICTION DRIVE FOR GEAR INVOLUTE ARTIFACT WITH LONG-ROLLED PATH LENGTH BY ROLLING METHOD

(71) Applicant: DALIAN UNIVERSITY OF TECHNOLOGY, Liaoning (CN)

(72) Inventors: Siying Ling, Liaoning (CN); Ming Ling, Liaoning (CN); Xiangsheng Liu, Liaoning (CN); Honglin Ren, Liaoning (CN); Yang Yang, Liaoning (CN); Liding Wang, Liaoning (CN)

(73) Assignee: DALIAN UNIVERSITY OF TECHNOLOGY, Liaoning (CN)

( * ) Notice: Subject to any disclaimer, the term of this patent is extended or adjusted under 35 U.S.C. 154(b) by 245 days.

(21) Appl. No.: 17/779,696

(22) PCT Filed: Jun. 30, 2021

(86) PCT No.: PCT/CN2021/103335
§ 371 (c)(1),
(2) Date: May 25, 2022

(87) PCT Pub. No.: WO2023/272539
PCT Pub. Date: Jan. 5, 2023

(65) Prior Publication Data
US 2023/0264244 A1    Aug. 24, 2023

(51) Int. Cl.
*B21B 1/08* (2006.01)
*B21B 1/085* (2006.01)

(52) U.S. Cl.
CPC .................................... *B21B 1/085* (2013.01)

(58) Field of Classification Search
CPC ......... B21B 1/08; B21B 1/0805; B21B 1/085; B24B 37/02; B24B 37/08; B24B 39/06; Y10T 29/477; B21D 3/10; B23F 23/003
(Continued)

(56) References Cited

U.S. PATENT DOCUMENTS

| | | | |
|---|---|---|---|
| 3,849,891 | A | 11/1974 | Pratt et al. |
| 4,512,109 | A | 4/1985 | Van de Locht |

FOREIGN PATENT DOCUMENTS

| | | |
|---|---|---|
| CN | 101357444 A | 2/2009 |
| CN | 102500835 A | 6/2012 |

(Continued)

OTHER PUBLICATIONS

CN 110039021A, Zhang et al. Jul. 2019.*
(Continued)

*Primary Examiner* — Edward T Tolan
(74) *Attorney, Agent, or Firm* — MUNCY, GEISSLER, OLDS & LOWE, P.C.

(57) ABSTRACT

A generating device based on friction drive for gear involute artifact with long-rolled path length by rolling method is proposes. The device includes a roller component, rail component and friction-driven component, wherein the roller component consists of a gear involute artifact with long rolled length, a mandrel, a multi-ball bearing for gear involute artifact, the base-circle plates, the parallel sleeves, a multi-ball bearing, the plain washers, the cross washers, and the locking nuts; the rail component consists of a foundation, a location baffle for base-circle plates, rails, the baffles, a location baffle for rail, copper washers, the connecting screws and the set screws of the rail; and the friction-driven component consists of a friction block, a motorized linear sliding table, a vertical sliding table, a vertical foundation and an adapter. It has good market application prospect and popularization value.

10 Claims, 5 Drawing Sheets

(58) Field of Classification Search
USPC .......................................................... 72/207
See application file for complete search history.

(56)     References Cited

FOREIGN PATENT DOCUMENTS

| | | |
|---|---|---|
| CN | 105156481 A | 12/2015 |
| CN | 108061651 A | 5/2018 |
| CN | 111256615 A | 6/2020 |
| CN | 112658414 A | 4/2021 |
| GB | 746586 A | 3/1956 |

OTHER PUBLICATIONS

KR 20130085239A, Woo Jul. 2013.*
CN 113478024A, Ling et al. Oct. 2021.*
CN 113500255A, Ling et al. Oct. 2021.*

* cited by examiner

GENERATING DEVICE BASED ON FRICTION DRIVE FOR GEAR INVOLUTE ARTIFACT WITH LONG-ROLLED PATH LENGTH BY ROLLING METHOD

FIELD OF THE INVENTION

The present invention belongs to the technical field of precision gear machining and measurement, which involves a generating device based on friction drive for gear involute artifact with long-rolled path length by rolling method and is used to generate involute machining and measurement reference.

BACKGROUND

Involute profile is a kind of gear profile with extensive use and most mature processing technology currently, which is widely used in various fields such as reducers, transmission, gear tools, high-end equipment, industrial robots, etc.

The gear involute artifact is a device that represents the highest precision of gear involute machining, which is used to transfer value of involute parameters. It is a standard measurement instrument for calibrating various involute measurement instruments, transferring value of involute parameter, correcting instrument indication and determining indication error of the instrument and so on.

Invention patent (ZL201510091994.7) disclosed a high-precision radially adjustable gear involute artifact and its adjustment method, which proposed that the tolerance requirement of involute profile slope deviation up to three tooth flanks can be adjusted to the same by adjusting the installation eccentricity of gear involute artifact on mandrel. Invention patent (ZL201610847011.2) disclosed a gear involute artifact with long-rolled path length, which is composed of involute artifact, sector base-circle blocks and auxiliary support ball head screw. The structure of gear involute artifact has advantages of simple structure and compact quality in making gear involute artifact with large base-circle parameters. Since the absence of designed rotation center of the gear involute artifact, the center of gear involute artifact determined by external cylindrical surface of base-circle blocks will bring large errors and affect application accuracy. Invention patent (ZL201711393983.X) disclosed a self-assembled reference gear involute artifact whose left and right tooth flanks have equal common lines. The gear involute artifact has inner datum hole and datum end with axisymmetric structure. Therefore, it is beneficial to make the structure of gear involute artifact have better performance and obtain high machining accuracy. The new structure of gear involute artifact is mentioned by disclosed patents, but none of them involve specific devices and methods for machining and measuring gear involute artifact.

Base on gear involute artifact national standard GB/T 6467-2010, the accuracy class of gear involute artifact can be divided into Class-1 accuracy and Class-2 accuracy. For radius of base circle is $r_b \leq 100$ mm, 100 mm$<r_b \leq 200$ mm, 200 mm$<r_b \leq 300$ mm and 300 mm$<r_b \leq 400$ mm, the involute profile form tolerance $f_{f\alpha T}$ is 1.0 μm, 1.4 μm, 1.7 μm and 2.1 μm respectively. The designed roll path length of gear involute artifact corresponding to radius of the base circle $r_b$=100 mm, 200 mm, 300 mm, 400 mm should be not less than 70 mm, 105 mm, 140 mm and 160 mm respectively. The surface roughness of the involute surface is less than Ra 0.1 μm. Base on the national metrological verification regulation of gear involute artifact JJG 332-2003 of China, which only provides verification regulation of gear involute artifact with base radius $r_b \leq 200$ mm and the designed roll path length corresponding to different base radius. The gear involute artifact with roll path length refers to longer than 100 mm. There is currently no corresponding design, products, machining and measurement methods in China.

In the field of the large gear artifact: in year 2009, Federal German Physical Technology Research (PTB) manufacture a sector large gear artifact with tip diameter about 1000 mm, rolled length of the involute about 120 mm and the gear profile form deviation about 1.8 μm, which is the gear artifact with the largest involute rolled length reported publicly. In year 2011, PTB design and manufacture a lager ring gear standard artifact with tip diameter about 2000 mm, rolled length of involute about 84 mm, and the gear profile form deviation about 2 μm, which is the gear artifact with largest base diameter reported publicly. The national metrology institute of China has also developed a large gear standard artifact with tip diameter about 1000 mm, however its manufacturing accuracy only between Class-4 and Class-2. The rolled length of above-mentioned gear standard artifacts is short relative to diameter parameter, and cannot meet the basic requirements of roll path length of gear involute artifact according to national standard of gear involute artifact GB/T 6467-2010 in China.

The high-precision gear research laboratory of Dalian university of technology has developed a gear involute artifact with roll path length of 60 mm and profile form deviation less than 0.5 μm, which meets the tolerance requirements of gear involute artifact with Class-1 accuracy in China. However, the gear involute artifact with longer roll path length is not involved.

The basic generating principle of involutes is that a straight-line rolls around a circle, and trajectory of any point on the line is an involute with the circle as base circle. It is a consensus in industry to realize the pure rolling spreading based on friction drive for machining high-precision gear involute artifact. Compared to general gear involute artifact, the gear involute artifact with long-rolled path length has characters in large size, heavy mass and difficultly driving. Meanwhile The design and driving problems of rolling components still need to be solved.

SUMMARY

In order to solve the manufacturing challenge of the involute gear with submicron profile accuracy and long-rolled path length, the present invention proposes a generating device and rolling method for gear involute artifact with long-rolled path length based on friction drive, which is used as generating involute machining and measurement reference.

The specific technical solutions are as follows:

A generating device based on friction drive for gear involute artifact with long-rolled path length by rolling method, comprising roller component, rail component and friction-driven component.

The roller component consists of a gear involute artifact with long-rolled path length, a multi-ball bearing for gear involute artifact, a mandrel, a left base-circle plate, a right base-circle plate, a left parallel sleeve, a right parallel sleeve, a left multi-ball bearing, a right multi-ball bearing, a left plain washer, a right plain washer, a left cross washer, a right cross washer, a left locking nut and a right locking nut. The mandrel is axial installation datum of the entire roller component. The middle of mandrel is a high-precision cylindrical surface and both ends of the mandrel have symmetrical fine thread. The above left and right base-circle plates are located and assembled on the both ends of mandrel with the left and right multi-ball bearings. The gear involute artifact with long-rolled path length is located and assembled on the middle of mandrel with the multi-ball bearing for gear involute artifact. There is a clearance fit between the left parallel sleeve, right parallel sleeve and mandrel. In order to ensure the axial location accuracy of the left and right base-circle plates and gear involute artifact, the ends of left and right parallel sleeves are respectively fitted and located on the datum end of gear involute artifact. The other locating ends of left and right parallel sleeves are respectively fitted and located on the inner end for axial location of left and right base-circle plates. The left locking nut, left cross washer, and the left plain washer for locking the end of left base-circle plate are assembled on mandrel in order from left end of mandrel to inside. The right locking nut, right cross washer, and the right plain washer for locking the end of right base-circle plate are assembled on mandrel in order from right end of mandrel to inside.

The rail component consists of a foundation, a left rail, a right rail, a left baffle, a right baffle, a location baffle for left rail, a location baffle for right rail and a location baffle for base-circle plate. The structure of the foundation is designed to U-shaped, whose top surface of protruding structure is regarded as the locating surface of rail. The left rail and right rail are tensile bodies with a thin waist section, and the section shape of them is of a bilateral and up-and-down symmetry structure. The left rail is installed on the locating surface of foundation with left baffle and the location baffle for left rail. The right rail is installed on the locating surface of foundation with right baffle and the location baffle for right rail. The location baffle for base-circle plate is installed on platform, which is used to locate foundation and the ends of left rail and right rail. The top surfaces of rails are working surfaces, and roller component makes a pure-pure-pure-pure-rolling generating motion on the top surfaces of rails.

The friction-driven component consists of friction block, a motorized linear sliding table, an adapter, a vertical sliding table and a vertical foundation. The friction block comprises a rigid friction block substrate and flexible friction washers with a large friction coefficient. The friction block is installed on motorized linear sliding table, and the friction washers are elastically pressed against the cylindrical surface of left base-circle plate and right base-circle plate respectively. The motorized linear sliding table is installed on the vertical sliding table with the adapter, and vertical sliding table is installed on the vertical foundation, meanwhile the vertical foundation is installed on the platform. The motorized linear sliding table drives the friction block, and then drive the roller component to do rolling-generation motion on the rail component by friction.

Furthermore, the section shape of left rail and right rail are wide rectangle, inverted trapezoid, narrow rectangle, trapezoid and wide rectangle from top to bottom. The included angle between the lateral slope surface of rail and the working surface of rail is 60°-80°. The connecting holes of rail are uniformly distributed in lateral middle rectangular area of rail, which are used to connect left rail and right rail for synchronous machining and measuring. When the left and right guide rails are in use, the relative orientation of left and right guide rails should not be changed. The two ends of rails are provided with the screw holes for connecting other accessory parts.

Furthermore, the rail component also consists of copper washers, the connecting screws and the set screws of rails. The left and right baffles and location baffle for left rail and right rail are provided with a row of through holes and a row of screw holes for connection of the connecting screws and the set screws of rails. In order to ensure the reliability of rails location, the set screws of rails apply force to the lateral slope surface of rail with copper washers, and the horizontal component force make left rail and right rail to press the location baffle for left rail and right rail, meanwhile the vertical component force make left rail and right rail to press the foundation.

Furthermore, the structure of left and right base-circle plates is of an incomplete circle with the same size, which is convenient for reducing weight and machining the left and right base-circle plates. Several holes are uniformly distributed on the middle web of left and right base-circle plates for reducing weight and taking conveniently. The left and right base-circle plates are provided with two symmetrically-arranged and concentric cylindrical surfaces with equal diameter and an inner datum hole. The cylindrical surface at one end of base-circle plate is the datum cylindrical for generating, and the cylindrical surface at the other end of base-circle plate is a cylindrical surface for friction drive. The center angle corresponding to cylindrical surface is 10% larger than the design generating angle corresponding to the roll path length of gear involute artifact. The lateral datum is parallel to the central axis of inner datum hole. When the roller component is assembled, the lateral datum of left and right base-circle plates is coplanar.

Furthermore, the left and right tooth flanks of the gear involute artifact are of equal common lines. The datum inner hole is used for radial location of gear involute artifact with long-rolled path length. The datum ends used for axial location of gear involute artifact with long-rolled path length are parallel and both of them are perpendicular to the central axis of the datum inner hole. The datum cylindrical is the installation datum of gear involute artifact in the transfer value of involute parameter, which is coaxial with the datum inner hole. The slots for reducing weight are arranged uniformly on the web plate to facilitate the weight reduction of the large generating length of gear involute artifact.

Furthermore, when the roller component is assembled, the left multi-ball bearing, the left base-circle plate, the left plain washer, the left cross washer and the left locking nut are assembled on mandrel from one end in order. Then the left base-circle plate is placed on the datum plane, keeping the lateral datum of left base-circle plate contacts with datum plane. The left parallel sleeve, the multi-ball bearing for gear involute artifact, the gear involute artifact, the right parallel sleeve, the right multi-ball bearing, the right base-circle plate, the right plain washer, the right cross washer and the right locking nut are assembled on the mandrel in order. By adjusting the location of the gear involute artifact, the central axis of the left and right base-circle plates and the central axis of gear involute artifact can be aligned. Meanwhile the left and right lock nuts are synchronously tightened.

Furthermore, the left and right multi-ball bearings and multi-ball bearing for gear involute artifact are made of bearing steel balls with G3 or G5 grade. The bearing steel balls in left and right multi-ball bearings interferes to inner hole of left and right base-circle plates and mandrel by 1~3 μm. And the bearing steel balls in the multi-ball bearing for gear involute artifact interfere to inner hole of gear involute artifact and mandrel by 1~3 μm.

Furthermore, in order to connect with left and right baffles and location baffle for left rail and right rail, the foundation is designed to U-shaped structure, in which the nuts are embedded on both sides. The top surface of foundation is datum for installing left rail and right rail. The foundation is fixed on platform by bonding or with screws, and nuts are embedded on the platform to install foundation and the location baffle for base-circle plates.

Furthermore, the location baffle for base-circle plate is of an L-shaped stretching body, in which the groove of baffle is arranged in the middle of stretching direction. The sides of groove areused as location base-circle plates. When the roller component is assembled on the rail component, the lateral datum of left and right base-circle plates is parallel to the location surface of base-circle plate. The bottom surface of location baffle for base-circle plates is the datum for installing, in which 1~3 rows fixing counter bores for connecting baffles are arranged.

Furthermore, after assembly of whole rail component, aging treatment should be carried out to eliminate the residual stress and the stress of installation, and then the working surfaces of rails should be grinded precisely.

The invention has the beneficial effects that the invention provides a generating device for generating involute machining and measurement reference based on friction drive for gear involute artifact with long-rolled path length by rolling method, comprising the roller component, the rail component, the friction-driven component. The new structure of large base-circle plates is beneficial for its machining, measuring and using. The structure of roller component is symmetrical and the radial datum surfaces are unified, in which the ends of gear involute artifact are taken as the axial datum for installation. The moving distance of the motorized linear sliding table is twice that of the roller component. The friction washers are flexible, which is beneficial to reducing the influence of non-axial error and vibration and other environmental errors of the motorized linear sliding table on the pure-pure-pure-pure-rolling generating accuracy. The device machines and measures involute lines without principle errors and can be used in the field of machining and measurement gear involute artifact with long-rolled path length and Class-1 accuracy, and has good market application prospect and popularization value.

BRIEF DESCRIPTIONS OF THE DRAWINGS

Figure 1:
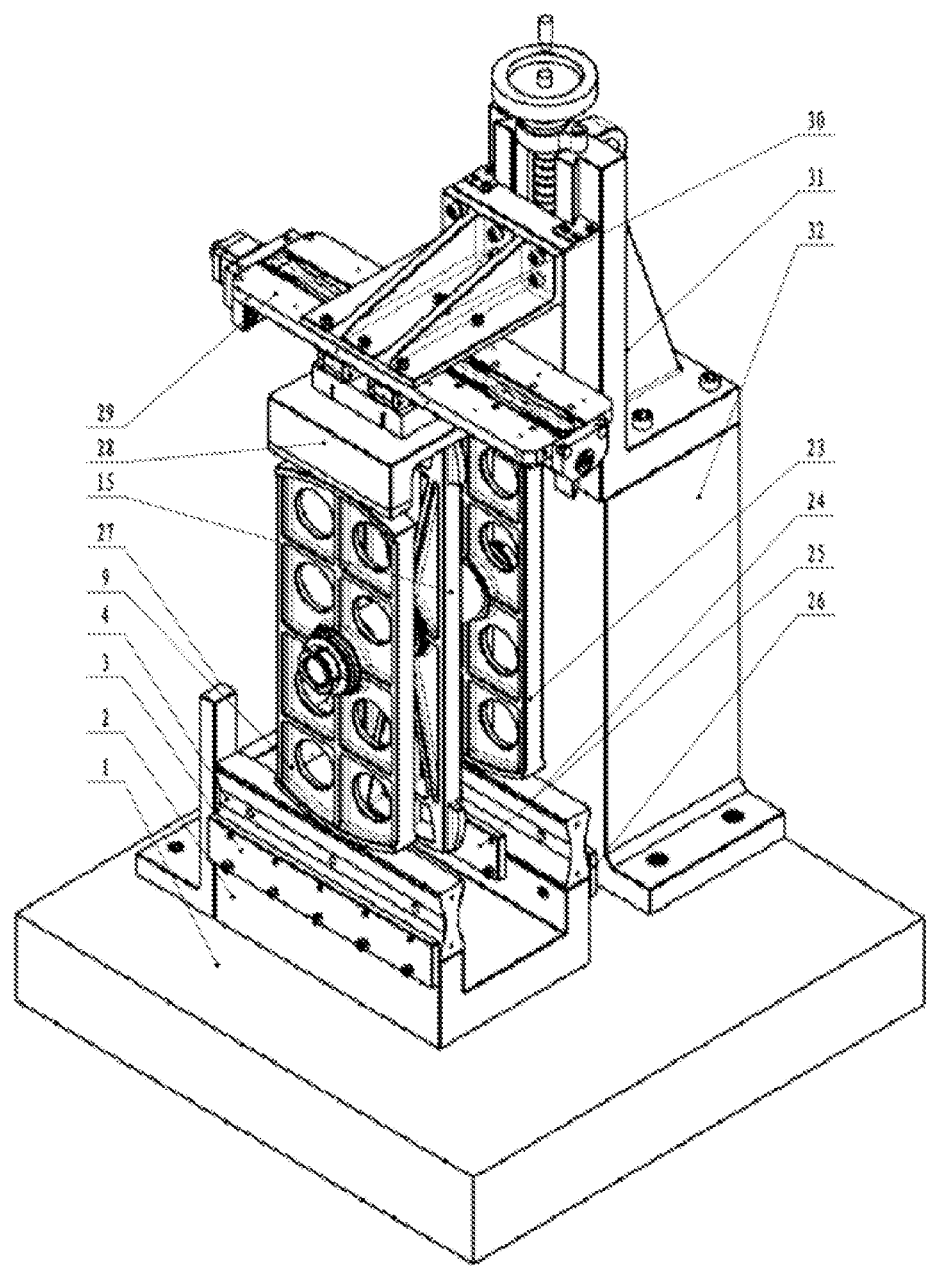
FIG. 1 illustrates a model diagram of roller component and friction-driven component of gear involute artifact with long-rolled path length.
Figure 2:
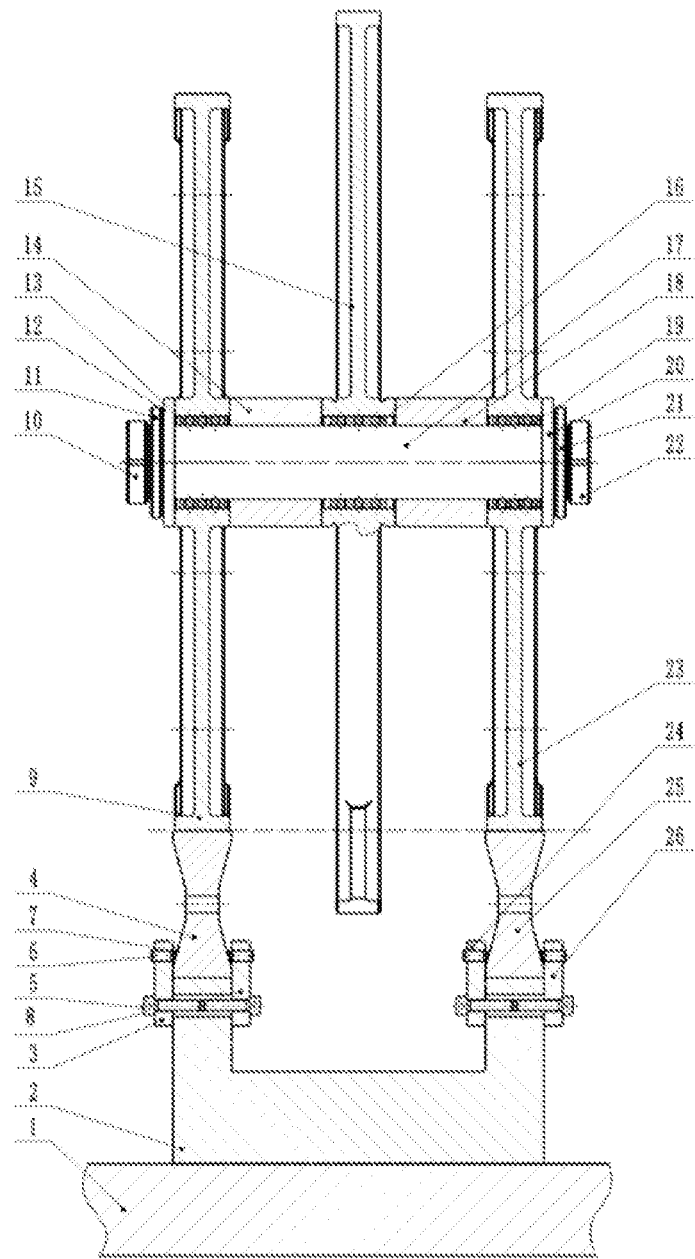
FIG. 2 illustrates a sectional diagram of roller component and friction-driven component of gear involute artifact with long-rolled path length.
Figure 3:
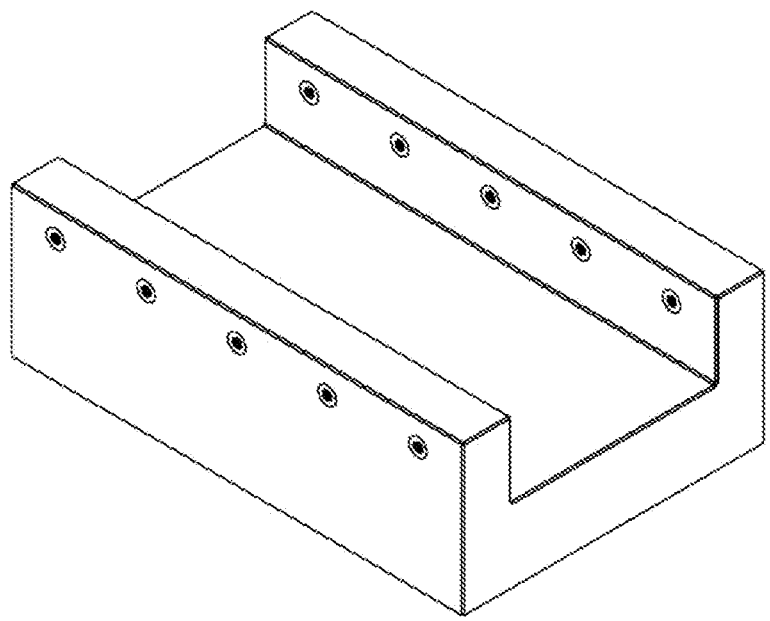
FIG. 3 illustrates a foundation of marble.
Figure 4:
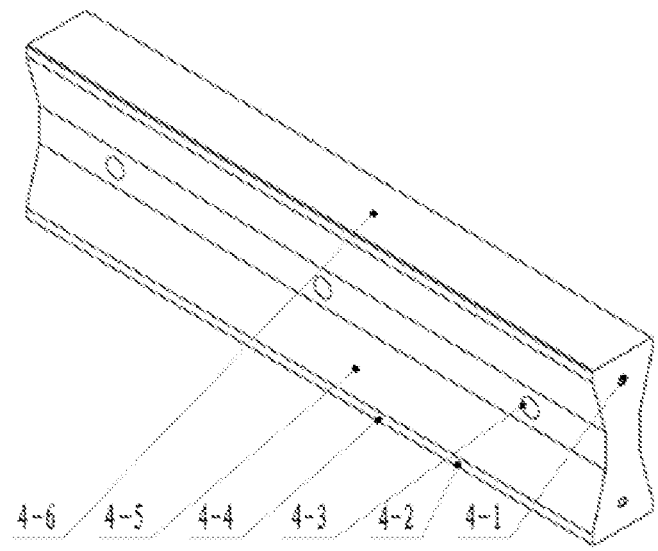
FIG. 4 illustrates a rail.
Figure 5:
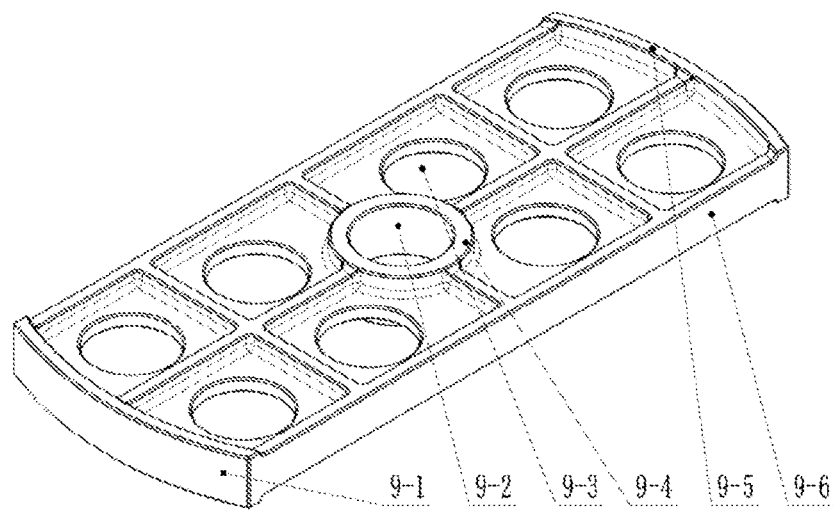
FIG. 5 illustrates a large base-circle plate.
Figure 6:
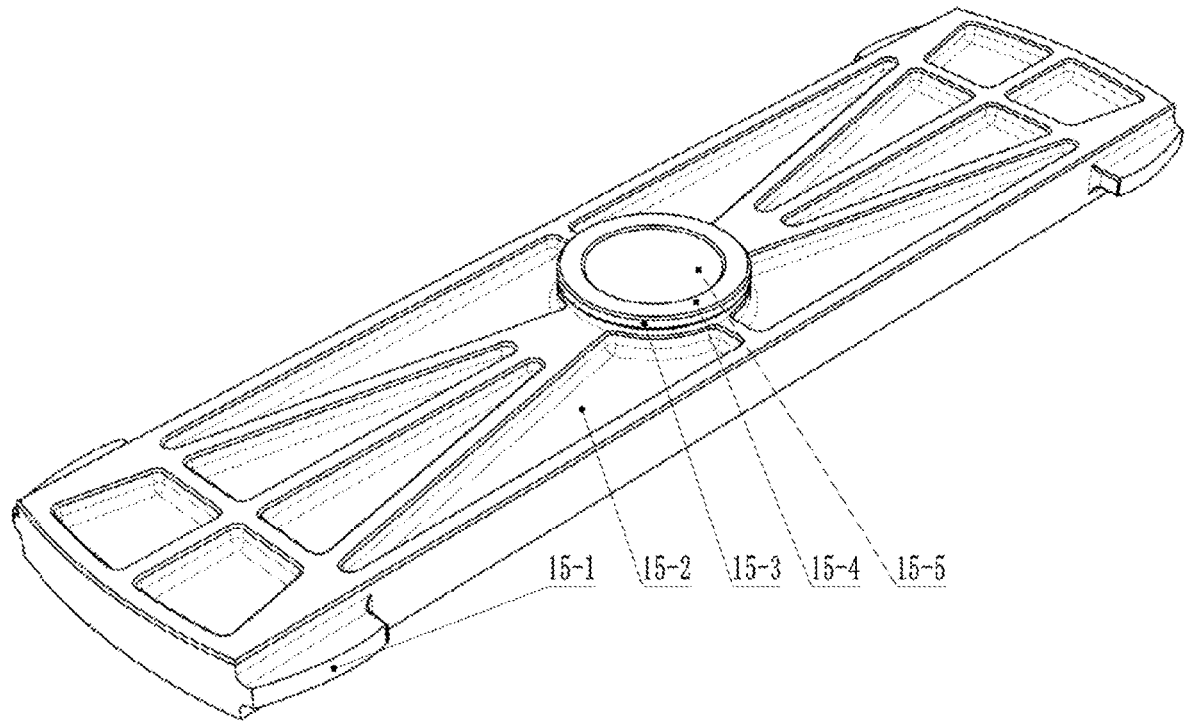
FIG. 6 illustrates a gear involute artifact with long-rolled path length.
Figure 7:
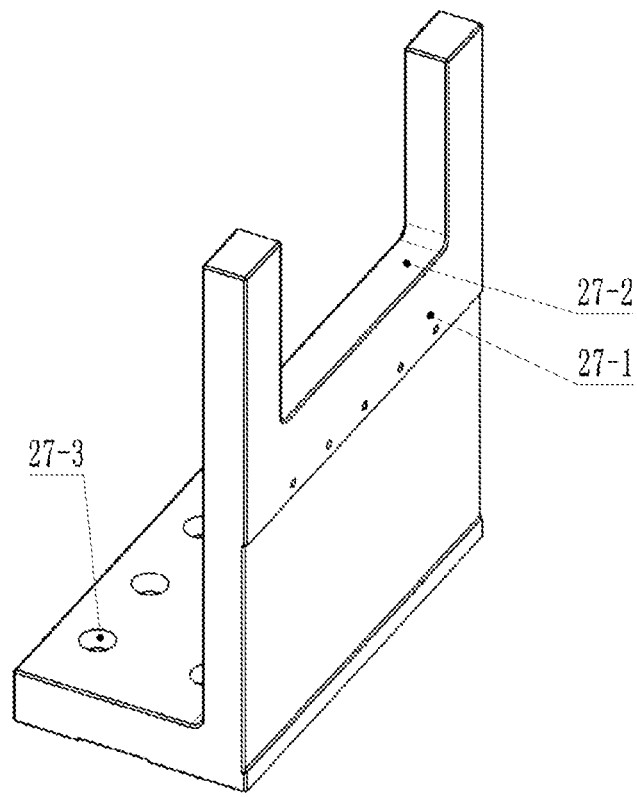
FIG. 7 illustrates a location baffle for base-circle plates.
Figure 8:
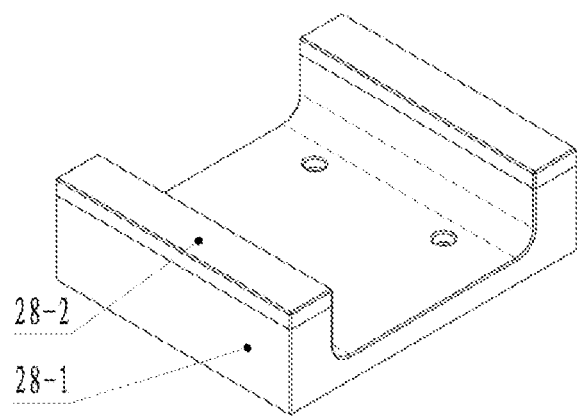
FIG. 8 illustrates a friction block.

In the FIG.: 1 platform; 2 foundation; 3 left baffle; 4 left rail; 4-1 screw hole for connection; 4-2 lateral locating surface of rail; 4-3 connecting hole of rail; 4-4 bottom surface of rail; 4-5 lateral slope surface of rail; 4-6 top surface of rail; 5 set screw of rail; 6 connecting screw; 7 copper washer; 8 location baffle for left rail; 9 left base-circle plate; 9-1 cylindrical surface; 9-2 inner datum hole; 9-3 hole of web plate; 9-4 inner end for axial location; 9-5 outer end for axial measurement; 9-6 lateral datum; 10 left locking nut; 11 left cross washer; 12 left plain washer; 13 left multi-ball bearing; 14 left parallel sleeve; 15 gear involute artifact with long-rolled path length; 15-1 involute tooth flank; 15-2 slot for reducing weight; 15-3 datum cylindrical; 15-4 datum end; 15-5 inner datum hole; 16 multi-ball bearing for gear involute artifact; 17 mandrel; 18 right parallel sleeve; 19 right multi-ball bearing; 20 right plain washer; 21 right cross washer; 22 right locking nut; 23 right base-circle plate; 24 location baffle for right rail; 25 right rail; 26 right baffle; 27 location baffle for base-circle plate; 27-1 location surface of base-circle plate; 27-2 groove of baffle; 27-3 fixing counter bore for connecting baffle; 28 friction block; 28-1 friction block substrate; 28-2 friction washers; 29 motorized linear sliding table; 30 adapter; 31 vertical sliding table; 32 vertical foundation.

DETAILED DESCRIPTION

Taking the radius of base-circle plates as 200 mm, the length of rail as 300 mm, the base-circle radius of gear involute artifact as 200 mm and the roll path length as 141.5 mm for example, the specific embodiment of the invention is described as follows.

The roller component comprises a gear involute artifact with long-rolled path length 15, a multi-ball bearing for gear involute artifact 16, a mandrel 17, a left base-circle plate 9, a right base-circle plate 23, a left parallel sleeve 14, a right parallel sleeve 18, a left multi-ball bearing 13, a right multi-ball bearing 19, a left plain washer 12, a right plain washer 20, a left cross washer 11, a right cross washer 21, a left locking nut 10, a right locking nut 22.

The middle of mandrel 17 is of a high-precision cylindrical surface and both ends of it have symmetrical fine thread.

In order to reduce the weight of left and right base-circle plates 9 and 23 and increase the friction with left rail 4 and the right rail 25, the base-circle plates 9 and 23 are made of nanoscale silicon carbide powder by high-temperature sintering. The left and right base-circle plates 9 and 23 are made of an incomplete circle with the same size. The roundness error of left and right base-circle plates is no more than 0.5 μm, and the difference in diameter of the two base-circle plates should not be more than 1 μm. Several holes 9-3 are uniformly distributed on the middle web of left and right base-circle plates 9 and 23 for reducing weight and taking conveniently. The left and right base-circle plates 9 and 23 are arranged symmetrically with two concentric cylindrical surfaces 9-1 with equal diameter and an inner datum hole 9-2. One cylindrical surface 9-1 of base-circle plate is the datum cylindrical for generating, and the other cylindrical surface 9-1 is used for friction drive. The center angle corresponding to cylindrical surface 9-1 is 10% larger than the design generating angle corresponding to the roll path length of gear involute artifact 15. The inner end for axial location 9-4 at the same end of left and right base-circle plates 9 and 23 are coplanar with the tow outer ends for axial measurement 9-5, and the flatness error of them is no more than 0.2 μm. The tow outer ends for axial location 9-4 at the same end of left and right base-circle plates 9 and 23 are parallel with the tow outer ends measurement 9-5, and the parallelism error of them is no more than 0.3 μm. The lateral datum 9-6 of left and right base-circle plates 9 and 23 is parallel to the central axis of the inner datum hole 9-2, and the parallelism error of them is no more than 1 μm. The lateral datum 9-6 of the left and right base-circle plates 9 and 23 are coplanar.

The left and right tooth flanks of the gear involute artifact 15 are of equal common lines. The datum inner hole 15-5 is used for radial location of gear involute artifact with long-rolled path length. The datum ends 15-4 are used for axial location of gear involute artifact with long-rolled path length. The datum cylindrical 15-3 is the installation datum of gear involute artifact with long-rolled path length in the transfer value of involute parameter. The slots slot for reducing weight 15-2 is used to reduce weight of gear involute artifact with long-rolled path length 15.

The left and right base-circle plates 9 and 23 are located and assembled on the both ends of mandrel 17 with the left multi-ball bearing 13 and the right multi-ball bearing 19. The gear involute artifact with long-rolled path length is located and assembled on the middle of mandrel 17 with multi-ball bearing for gear involute artifact 16. The left multi-ball bearing 13, the right multi-ball bearings 19 and the multi-ball bearing for gear involute artifact 16 are made of bearing steel ball with G3 or G5 grade. The bearing steel ball in left and right multi-ball bearings 13 and 19 interferes to inner hole 9-2 of left and right base-circle plates 9 and 23 and mandrel by 1~3 µm, and the bearing steel ball in the multi-ball bearing for gear involute artifact 16 interfere to inner hole 15-5 of gear involute artifact 15 and mandrel 17 by 1~3 µm.

There is a clearance fit between left parallel sleeve 14, right parallel sleeve 18 and mandrel 17, in order to ensure that the axial location accuracy of the left and right base-circle plates 9 and 23 with gear involute artifact with long-rolled path length 15, the ends of left and right parallel sleeves 14 and 18 are respectively fitted and located on the datum end 15-4 of gear involute artifact with long-rolled path length 15. The other locating ends of left and right parallel sleeves 14 and 18 are respectively fitted and located on the inner end for axial location 9-4 of left and right base-circle plates 9 and 23. The parallelism error of both ends is no more than 0.2 µm.

When the roller component is assembled, the left multi-ball bearing 13, the left base-circle plate 9, the left plain washer 12, the left cross washer 11 and the left locking nut 10 are assembled on mandrel 17 from one end in order. Then the left base-circle plate 9 is placed on the datum plane, keeping the lateral datum 9-6 of left base-circle plate contacts with datum plane. And then the left parallel sleeve 14, the multi-ball bearing for gear involute artifact 16, the gear involute artifact with long-rolled path length 15, the right parallel sleeve 18, the right multi-ball bearing 19, the right base-circle plate 23, the right plain washer 20, the right cross washer 21, and the right locking nut 22 are assembled on the mandrel 17 in order. By adjusting the location of the gear involute artifact with long-rolled path length 15, the central axis of the left and right base-circle plates 9 and 23 and central axis of gear involute artifact can be aligned, meanwhile the left and right lock nuts 10 and 22 are synchronously tightened.

The rail component comprises a foundation 2, a left rail 4, a right rail 25, a left baffle 3, a right baffle 26, a location baffle for the left rail 8, a location baffle for the right rail 24, the copper washers 7, the connecting screws 6, set screws of the rail 5 and a location baffle for base-circle plate 27.

The left rail 4 and the right rail 25 are tensile bodies with a thin waist section, and section shape of them is of a bilateral and up-to-down symmetry structure, whose section shape of left rail and right rail are wide rectangle, inverted trapezoid, narrow rectangle, trapezoid and wide rectangle from top to bottom. The included angle between the lateral slope surface of rail 4-2 and the working surfaces of rail 4-6 is 60°~80°. The connecting holes of the rail 4-3 are uniformly distributed in the lateral middle rectangular area of the left rail 4 and the right rail 25, which are used to connect the left rail 4 and the right rail 25 for synchronous machining and measuring. When the left rail 4 and the right rail 25 are in use, the relative orientation of left rail 4 and the right rail 25 should not be changed. The two ends of the left rail 4 and the right rail 25 are provided with the screw holes 4-1 for connecting other accessory parts conveniently. The left rail 4 and the right rail 25 are made of bearing steel or silicon carbide with large friction coefficient, and the friction coefficient can reach 0.6~0.8. The bottom surface 4-4 of rail is the location surface, keeping contact with foundation 2, and the flatness error of bottom surface 4-4 of rail is less than 0.5 µm. The top surface 4-6 of the rails is working surface, on which the roller component makes a pure-pure-pure-pure-rolling generating motion, and the flatness error of the working surfaces of rails 4-6 is less than 0.2 µm. The parallelism error between top surface of rail 4-band bottom surface of rail 4-4 is less than 1 µm. The width of the working surface of rail 4-6 and bottom surface of rail 4-4 is 1~2 mm longer than that of left and right base-circle plates 9 and 23.

The left right baffle 3, the right baffle 26, the location baffle 8 for left rail and location baffle 24 for right rail are provided with a row of through holes and a row of screw holes for connecting the connecting screws 6 and the set screws of rails 5. The set screws of rails 5 exert a force on lateral locating surface of rail 4-2 with copper washer 7, then tight the set screws of rails 5 on left and right baffles 3 and 26 in the order of middle first and then both sides, in order to press the left rail 4 and the right rail 25 and on the location baffle for left rail and right rail 8 and 24 respectively, next tight the set screws of rails 5 on location baffle for left rail and right rail 8 and 24 in the order of middle first and then both sides. The horizontal component forces the left rail and right rail 4 and 25 to press the location baffle 8 and 24 for the left rail and right rail respectively, and the vertical component forces the left rail and right rail 4 and 25 to press the foundation 2, so as to ensure the positioning reliability of the left rail and right rail 4 and 25. The horizontal component force make left rail and right rail 4 and 25 to press the location baffle for left rail and right rail 8 and 24, meanwhile the vertical component force make left rail and right rail 4 and 25 to press the foundation 2, which the reliability of location of left rail and right rail 8 and 24 are guaranteed.

The foundation 2 is designed to U-shaped structure, in which the nuts are assembled on both sides, and the left and right baffles 3 and 26 and the location baffles 8 and 24 for the left rail and right rail are connected to the foundation 2 with the connecting screws 6. The top surface of the foundation 2 is the datum for installing the left rail and right rail 4 and 25. The foundation 2 is fixed on the platform 1 by bonding or with screw connection.

The nuts are embedded on platform 1 to install foundation 2, location baffle for base-circle plate 27 and vertical foundation 32.

The location baffle 27 for base-circle plate is of an L-shaped stretching body, in which the groove of the baffle 27-2 is arranged in the middle of stretching direction. The sides of groove are used as location base-circle plates 27-1. The bottom surface of location baffle 27 for base-circle plate is the datum for installation, in which 1~3 rows fixing counter bores 27-3 for connecting baffle are arranged.

After the assembly of whole rail component, aging treatment should be carried out to eliminate the residual stress and the stress of installation, and then the working surfaces of rails 4-6 should be grinded precisely.

The friction-driven component comprises the friction block 28, a motorized linear sliding table 29, an adapter 30, a vertical sliding table 31 and a vertical foundation 32.

In order to reduce the weight, the friction block substrate 28-1 is made of aviation aluminum, friction washers 28-2 are elastically pressed against the cylindrical surface 9-1 of the left and right base-circle plates 9 and 23 respectively, and the flatness error of e contacting surface of left and right base-circle plates 9 and 23 between friction washers 28-2 is no more than 10 μm. The friction washers 28-2 is made of polyurethane or silica gel with shore hardness of A70-A90. The friction block 28 are assembled on motorized linear sliding table 29. The motorized linear sliding table 29 is installed on vertical sliding table 31 with adapter 30, and vertical sliding table 31 is installed on vertical foundation 32, meanwhile the vertical foundation 32 is installed on platform 1. The motorized linear sliding table 29 drives friction block 28, and then drive the roller component to do rolling-generation motion on the left rail 4 and the right rail 25 by friction. By adjusting the vertical sliding table 31, the pressing force of friction block 28 on the left and right base-circle plates 9 and 23 can be controlled, and the pressing force is generally 5-50N.

The gear involute artifact with long-rolled path length can be machined by arranging grinding wheel or grinding tool on the working surface of rail. The measurement points of probe are arranged on the working surface of rail, then the data are collected along normal direction of involute artifact, which can realize the measurement of gear involute artifact with long-rolled path length.

The invention claimed is:

1. A generating device based on friction drive for a gear involute artifact with long-rolled path length by a rolling method, wherein the device comprises a roller component, a rail component and a friction-driven component;

wherein the roller component consists of a gear involute artifact with long-rolled path length, a multi-ball bearing for the gear involute artifact, a mandrel, a left base-circle plate, a right base-circle plate, a left parallel sleeve, a right parallel sleeve, a left multi-ball bearing, a right multi-ball bearing, a left plain washer, a right plain washer, a left cross washer, a right cross washer, a left locking nut and a right locking nut; the mandrel is an axial installation datum of the roller component; a middle of the mandrel is a high-precision cylindrical surface and both ends of the mandrel have symmetrical fine thread; the left and right base-circle plates are located and installed on the both ends of the mandrel with the left and right multi-ball bearings and; the gear involute artifact with long-rolled path length is located and installed on the middle of the mandrel with the multi-ball bearing for the gear involute artifact; there is a clearance fit between the left parallel sleeve, right parallel sleeve and mandrel; in order to ensure an axial location accuracy of the left and right base-circle plates and the gear involute artifact, the ends of left and right parallel sleeves are respectively fitted and located on a datum end of the gear involute artifact with long-rolled path length; the other locating ends of the left and right parallel sleeves are respectively fitted and located on the end for axial location of the left and right base-circle plates; the left locking nut, the left cross washer, and the left plain washer for locking the end of the left base-circle plate are assembled on the mandrel in order from a left end of the mandrel to inside; the right locking nut, the right cross washer, and the right plain washer for locking the end of the right base-circle plate are assembled on mandrel in order from the right end of the mandrel to inside;

the rail component consists of a foundation, a left rail, a right rail, a left baffle, a right baffle, a location baffle for the left rail, a location baffle for the right rail and a location baffle for the base-circle plate; the structure of the foundation is of U-shaped, whose top surface of protruding structure is regarded as a locating surface of the left rail and the right rail; the left rail and the right rail are tensile bodies with a thin waist section, and a section shape of them is of a bilateral and up-and-down symmetry structure; the left rail is installed on the locating surface of the foundation by the left baffle and the location baffle for the left rail; the right rail is installed on the locating surface of the foundation by the right baffle and the location baffle for the right rail; the location baffle for the base-circle plate is installed on a platform, which is used to locate the foundation and the ends of the left rail and the right rail; the top surface of the left rail and the right rail is a working surface, and the roller component does a pure-rolling generating motion on the working surfaces of the left rail and the right rails; by adjusting the location of the gear involute artifact, the central axis of the left and right base-circle plates and the central axis of the gear involute artifact can be aligned; meanwhile the left and right lock nuts are synchronously tightened;

the friction-driven component consists of a friction block, a motorized linear sliding table, an adapter, a vertical sliding table and a vertical foundation; the friction block consists of a rigid friction block substrate and friction washers with larger friction coefficient; the friction block is installed on the motorized linear sliding table, and the friction washers are elastically pressed against the cylindrical surface of the left base-circle plate and the right base-circle plate respectively; the motorized linear sliding table is installed on the vertical sliding table with the adapter, and the vertical sliding table is installed on the vertical foundation, the vertical foundation is installed on the platform; the motorized linear sliding table drives the friction block, and then drives the roller component to do pure-rolling generating motion on the rail component by friction.

2. The generating device based on friction drive for the gear involute artifact with long-rolled path length by the rolling method according to claim 1, wherein the section shape of the left rail and the right rail are wide rectangle, inverted trapezoid, narrow rectangle, trapezoid and wide rectangle from top to bottom; an included angle between a lateral slope surface of the left rail and the right rail and the top surface of the left rail and the right rail or the bottom surface of the left rail and the right rail is 60° to 80°; the connecting holes of the left rail and the right rail are uniformly distributed in a lateral middle rectangular area of the left rail and the right rail, which are used to connect the left rail and the right rail for synchronous machining and measuring.

3. The generating device based on friction drive for the gear involute artifact with long-rolled path length by the rolling method according to claim 1, wherein the rail component also consists of washers, connecting screws and setscrews of rails; the left and right baffles and the location baffles for the left rail and the right rail are provided with a row of through holes and a row of screw holes for connection of the connecting screws and the setscrews of rails; in order to ensure the reliability of the left rail and the right rails location, the setscrews of rails apply force to the lateral slope of rail with copper washers, of which the horizontal component force make the left rail and the right rail to press the location baffles for the left rail and the right rail, the vertical component force make the left rail and the right rail to press the foundation.

4. The generating device based on friction drive for the gear involute artifact with long-rolled path length by the rolling method according to claim 1, wherein the structure of the left and right base-circle plates is of an incomplete circle with the same size, which is convenient for reducing weight and processing the left and right base-circle plates; several holes are uniformly distributed on the middle web of the left and right base-circle plates for reducing weight; the left and right base-circle plates and are arranged symmetrically with two concentric cylindrical surfaces with equal diameter and an inner datum hole; one cylindrical surface of the base-circle plate is a datum cylindrical for generating, and the other cylindrical surface is used for friction drive; a center angle corresponding to the one cylindrical surface is 10% larger than the design generating angle corresponding to the roll path length of the gear involute artifact; a lateral datum is parallel to the central axis of the inner datum hole; when the roller component is assembled, the lateral datum of the left and right base-circle plates are coplanar.

5. The generating device based on friction drive for the gear involute artifact with long-rolled path length by the rolling method according to claim 1, wherein the left and right tooth flanks of the gear involute artifact are of equal common line; a datum inner hole is used for radial location of the gear involute artifact with long-rolled path length; the datum ends are used for axial location of the gear involute artifact with long-rolled path length, which are parallel and perpendicular to the central axis of the datum inner hole; the datum cylindrical is a installation datum of the gear involute artifact in a transfer value of involute parameter, which is coaxial with the datum inner hole; slots for reducing weight are arranged uniformly on a web plate to facilitate the weight reduction of the large generating length of gear involute artifact.

6. The generating device based on friction drive for the gear involute artifact with long-rolled path length by the rolling method according to claim 1, wherein a left multi-ball bearing, a left large base-circle plate, a left plain washer, a left cross washer and a left locking nut are assembled on the mandrel from one end in order when assembling the roller component; then the left base-circle plate is placed on the datum plane, keeping the lateral datum of left base-circle plate contacts with datum plane; a left parallel sleeve, a multi-ball bearing for gear involute artifact, a gear involute artifact, a right parallel sleeve, a right multi-ball bearing, a right large base-circle plate, a right plain washer, a right cross washer and a right locking nut are assembled on the mandrel in order.

7. The generating device based on friction drive for the gear involute artifact with long-rolled path length by the rolling method according to claim 1, wherein the left and right multi-ball bearings and multi-ball bearing for the gear involute artifact are made of bearing steel balls of G3 or G5 grade; the bearing steel balls in left and right multi-ball bearings interfere to an inner hole of left and right base-circle plates and the mandrel by 1~3 μm; and the bearing steel balls in the multi-ball bearing for gear involute artifact interfere to an inner hole of the gear involute artifact and the mandrel by 1~3 μm.

8. The generating device based on friction drive for the gear involute artifact with long-rolled path length by the rolling method according to claim 1, wherein the foundation is designed to U-shaped structure, in which the left locking nut and the right locking nuts are embedded on both sides in order to connect with the left and right baffles and the location baffles for the left rail and the right rail; the top surface of the foundation is a datum for installing the left rail and the right rail; the foundation is fixed on the platform by bounding or with screws, and the left locking nut and the right locking nuts are embedded on the platform to install the foundation and the location baffles for the base-circle plates.

9. The generating device based on friction drive for the gear involute artifact with long-rolled path length by the rolling method according to claim 1, wherein the location baffle for the base-circle plate is of an L-shaped stretching body, in which a groove of the location baffle is arranged in the middle of a stretching direction; the sides of the groove are used to locate the base-circle plates; when the roller component is assembled on the rail component, the lateral datum of the left and right base-circle plates is parallel to the location surface of base-circle plate; the bottom surface of the location baffles for the base-circle plates is the datum for installing, in which 1~3 rows of fixing counterbores for connecting baffles are arranged on the bottom surface.

10. The generating device based on friction drive for the gear involute artifact with long-rolled path length by the rolling method according to claim 1, wherein an aging treatment is carried out to eliminate the residual stress and the stress of installation, and then the working surfaces of rails are grinded precisely after the assembly of the rail component.

* * * * *